No. 712,765. Patented Nov. 4, 1902.
J. H. COLE.
CLAMPING BAND.
(Application filed Nov. 22, 1901.)
(No Model.)
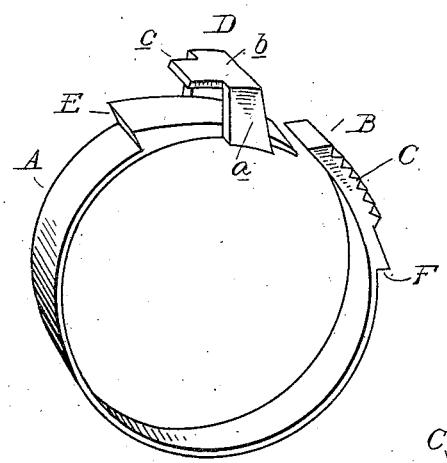
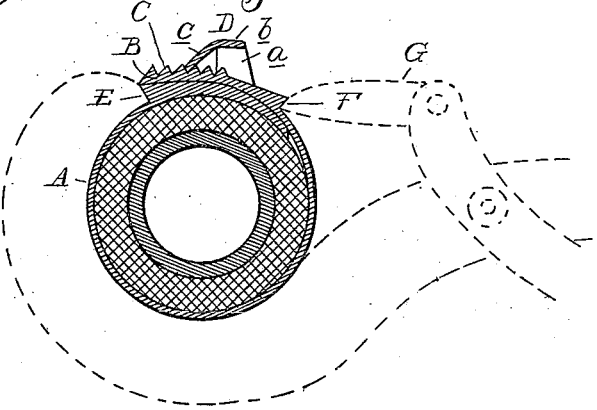
Witnesses
H. C. Smith.
M. B. Dougherty.
Inventor
Joseph H. Cole
By
attys.

UNITED STATES PATENT OFFICE.

JOSEPH H. COLE, OF DETROIT, MICHIGAN.

CLAMPING-BAND.

SPECIFICATION forming part of Letters Patent No. 712,765, dated November 4, 1902.

Application filed November 22, 1901. Serial No. 83,289. (No model.)

*To all whom it may concern:*

Be it known that I, JOSEPH H. COLE, a citizen of the United States, residing at Detroit, in the county of Wayne and State of Michigan, have invented certain new and useful Improvements in Clamping-Bands, of which the following is a specification, reference being had therein to the accompanying drawings.

The invention relates to the construction of clamping-bands especially designed for use in attaching hose to the coupling-nipples.

It is one of the objects of the invention to obtain a construction which may be formed entirely by casting without any machine-work and which at the same time is adapted to be easily attached to the hose and when once attached will be firmly locked in position.

The invention consists in the construction as hereinafter described and claimed.

In the drawings, Figure 1 is a perspective view of the clamping-band detached. Fig. 2 is a section showing the band as clamped upon the hose.

A is the band, preferably formed of malleable iron or other malleable cast metal. This band is preferably cast in the form of an open ring and at one end thereof is provided with a reinforced portion B, having a series of notches or teeth C formed on the outer face thereof. The opposite end of the band is preferably tapered to a thin edge, and near the end is formed a yoke D, the sides $a$ of which are separated sufficiently to receive the reinforced end B.

The top or connecting bar $b$ is sufficiently spaced from the band to easily receive the reinforced portion B and is provided with an extension $c$, projecting therefrom in a direction opposite from the adjacent end. The portion of the band upon which the yoke D is formed is also preferably reinforced, and at the inner end thereof is formed a shoulder E, a similar shoulder F being formed at the inner end of the reinforced portion B.

The structure as described may be readily formed by casting, a single core only being necessary in forming the yoke.

In use the band may be slipped over the end of the hose and coupling, or where this is not possible it may be opened out sufficient to slip over from the side. The end B is then inserted through the eye formed by the yoke D and tightly drawn around the hose. This may be accomplished by any suitable instrument, such as indicated by dotted lines at G, said instrument engaging with the opposite shoulders E and F. When the band has been drawn around with sufficient tension, the lug $c$, projecting from the cross-bar $b$ of the yoke, may be bent down, so as to engage one of the notches C. When thus bent the tool may be released and the lug $c$ will act as a locking-dog, which will hold the ends of the band from separating.

What I claim as my invention is—

1. A clamping-band comprising a strip having a yoke at one end thereof through which the opposite end of said strip is adapted to be inserted, and a bending lug on the outer portion of said yoke adapted to be pressed into engagement with a counter-shoulder on said inserted end.

2. A clamping-band comprising a strip having an integral yoke at one end thereof through which the opposite end of said strip is adapted to be inserted, and a bending lug on the outer portion of said yoke adapted to be pressed into engagement with a counter-shoulder on said inserted end.

3. A clamping-band comprising a flexible strip having its opposite ends reinforced one being formed with a series of teeth and the other with a yoke through which the toothed end is adapted to be inserted, and a bending lug on the outer portion of said yoke adapted to be pressed into engagement with one of said teeth.

4. A clamping-band comprising a strip having one end thereof formed with a series of teeth and the opposite end with an outwardly-projecting yoke through which said toothed end is adapted to be inserted, and a bending lug projecting laterally from said yoke adapted to be pressed down into an inclined position and into engagement with one of said teeth.

5. A clamping-band comprising a strip formed of malleable casting having teeth formed at one end thereof and an enlarged yoke at the opposite end through which said toothed end is adapted to be inserted, said yoke having a laterally-projecting bending lug for pressing into engagement with said teeth to lock the band.

In testimony whereof I affix my signature in presence of two witnesses.

JOSEPH H. COLE.

Witnesses:
C. H. AUSTIN,
JOHN R. FISHER.